United States Patent
Matsumoto et al.

(10) Patent No.: US 9,331,337 B2
(45) Date of Patent: May 3, 2016

(54) NON-AQUEOUS ELECTROLYTE SECONDARY BATTERY AND METHOD FOR PRODUCING THE SAME

(75) Inventors: Hiroyuki Matsumoto, Kobe (JP); Takeshi Ogasawara, Kobe (JP); Naoki Imachi, Kobe (JP)

(73) Assignee: SANYO Electric Co., Ltd., Daito-shi (JP)

( * ) Notice: Subject to any disclaimer, the term of this patent is extended or adjusted under 35 U.S.C. 154(b) by 481 days.

(21) Appl. No.: 13/047,465

(22) Filed: Mar. 14, 2011

(65) Prior Publication Data
US 2011/0223469 A1    Sep. 15, 2011

(30) Foreign Application Priority Data

Mar. 12, 2010    (JP) ................................. 2010-055874

(51) Int. Cl.
| | |
|---|---|
| *H01M 4/131* | (2010.01) |
| *H01M 4/62* | (2006.01) |
| *H01M 4/1391* | (2010.01) |
| *H01M 10/052* | (2010.01) |
| *H01M 10/058* | (2010.01) |
| *H01M 4/36* | (2006.01) |

(52) U.S. Cl.
CPC ............... *H01M 4/62* (2013.01); *H01M 4/131* (2013.01); *H01M 4/1391* (2013.01); *H01M 4/366* (2013.01); *H01M 10/052* (2013.01); *H01M 10/058* (2013.01); *Y02E 60/122* (2013.01); *Y02T 10/7011* (2013.01); *Y10T 29/49108* (2015.01); *Y10T 29/49115* (2015.01)

(58) Field of Classification Search
CPC ... H01M 4/131; H01M 4/366; H01M 10/052; H01M 4/1391; H01M 4/62; H01M 10/058
See application file for complete search history.

(56) References Cited

U.S. PATENT DOCUMENTS

| | | | |
|---|---|---|---|
| 7,326,498 B2 * | 2/2008 | Park et al. | 429/231.95 |
| 7,335,446 B2 | 2/2008 | Chiga et al. | |
| 2001/0008729 A1 * | 7/2001 | Ogasawara et al. | 429/223 |
| 2003/0077517 A1 * | 4/2003 | Nakanishi et al. | 429/324 |
| 2006/0078795 A1 | 4/2006 | Takahashi et al. | |
| 2006/0093911 A1 | 5/2006 | Chiga et al. | |
| 2006/0177739 A1 | 8/2006 | Endo et al. | |
| 2008/0268339 A1 | 10/2008 | Suzuki | |
| 2008/0318131 A1 * | 12/2008 | Watanabe et al. | 429/231.95 |
| 2009/0087362 A1 * | 4/2009 | Sun et al. | 423/179.5 |
| 2009/0208846 A1 | 8/2009 | Takahashi et al. | |
| 2010/0015527 A1 * | 1/2010 | Yamaguchi et al. | 429/224 |

FOREIGN PATENT DOCUMENTS

| | | | |
|---|---|---|---|
| CN | 1339182 A | 3/2002 | |
| JP | 2005-050779 A | 2/2005 | |
| JP | 2005-166656 * | 6/2005 | ............ C01D 15/00 |
| JP | 2005-166656 A | 6/2005 | |
| JP | 2005-243301 A | 9/2005 | |
| JP | 2006-127932 A | 5/2006 | |
| JP | 2008-277152 A | 11/2008 | |
| WO | 2005/008812 A1 | 1/2005 | |

OTHER PUBLICATIONS

Office Action dated Sep. 11, 2014, issued in corresponding Chinese Patent Application No. 201110042971.9 (7 pages).

* cited by examiner

*Primary Examiner* — Barbara Gilliam
*Assistant Examiner* — Angela Martin
(74) *Attorney, Agent, or Firm* — Westerman, Hattori, Daniels & Adrian, LLP

(57) ABSTRACT

A positive electrode active material with least part of a surface coated with a surface treatment layer composed of a phosphate compound. The phosphate compound contains at least one element selected from the group consisting of neodymium, samarium, europium, gadolinium, terbium, dysprosium, holmium, erbium, thulium, ytterbium, and lutetium.

11 Claims, No Drawings

NON-AQUEOUS ELECTROLYTE SECONDARY BATTERY AND METHOD FOR PRODUCING THE SAME

CROSS REFERENCE TO RELATED APPLICATIONS

The present invention contains subject matter related to Japanese Patent Application No. 2010-55874 filed in the Japan Patent Office on Mar. 12, 2010, the entire contents of which are incorporated herein by reference.

BACKGROUND OF THE INVENTION

1. Field of the Invention

The present invention relates to an improvement in a non-aqueous electrolyte secondary battery and a method for producing the secondary battery. In particular, the present invention relates to a non-aqueous electrolyte secondary battery that can achieve high reliability in a battery having high capacity and a method for producing the secondary battery.

2. Description of Related Art

In recent years, mobile information terminals such as cellular phones, notebook computers, and personal digital assistants (PDAs) have been rapidly decreasing in size and weight. With such a trend, a further increase in the capacity of batteries serving as driving power sources of such mobile information terminals has been demanded. To meet such a demand, a non-aqueous electrolyte secondary battery that uses an alloy which can occlude and release lithium ions, a carbon material, or the like as a negative electrode active material and uses lithium transition metal complex oxide as a positive electrode active material has been receiving attention as a battery having high energy density.

An increase in the capacity of existing non-aqueous electrolyte secondary batteries has been achieved by decreasing the thickness of a component such as a battery can, a separator, or a current collector (aluminum foil or copper foil) that is unrelated to capacity or by achieving a high packing density of an active material (by improving the packing density of an electrode). However, even if these means for increasing the capacity are employed, the capacity of non-aqueous electrolyte secondary batteries cannot be increased markedly. It is considered that by increasing the charge cut-off voltage, the capacity and energy density are increased. However, in the case where the charge cut-off voltage is increased, a positive electrode active material is degraded and an electrolyte is decomposed by oxidation, which poses a problem in that the battery characteristics are degraded.

In view of the foregoing, the surface treatment and the stabilization of a structure of a positive electrode active material have been actively researched. For example, there have been the following proposals.

(1) In the case where the charge cut-off voltage is increased, the stabilization of a structure of a positive electrode active material is achieved by incorporating a Zr element into a lithium transition metal oxide that has a layered structure and contains lithium and cobalt (see Japanese Patent No. 4307962 (Patent Document 1)).

(2) A technique in which at least part of a surface of a positive electrode active material is coated with a surface treatment layer composed of a phosphate compound represented by $MPO_k$ (M is at least one trivalent element and k is an integer of 2 to 4). According to this technique, by suppressing the reaction between an electrolyte and a positive electrode, the cycle characteristics are improved without decreasing the initial efficiency (see Japanese Published Unexamined Patent Application No. 2005-243301 (Patent Document 2)).

(3) A battery having good high-temperature swelling characteristics (that is, not swell even at high temperature) by using a positive electrode active material obtained as follows. An active material precursor is added dropwise to a coating solution obtained by mixing a phosphorus compound having a double bond such as $(NH_4)_2HPO_4$, a compound containing Al such as $Al(NO_3)_3 \cdot 9H_2O$, and water. A lithium source is added thereto and heat treatment is performed to obtain the positive electrode active material (see Japanese Published Unexamined Patent Application No. 2005-166656 (Patent Document 3)).

However, in the technique disclosed in Patent Document 1, when the charge cut-off voltage is increased, the structure of a positive electrode active material can be stabilized to some degree, but the degree of the stabilization is insufficient. Thus, the battery capacity is significantly reduced when a battery is stored at high temperature. The techniques disclosed in Patent Documents 2 and 3 provide a structure in which a positive electrode active material is coated with a compound of aluminum or lanthanum. In the case where the charge cut-off voltage is 4.2 V, the effects achieved by such a structure are produced to some extent. However, in the case where the charge cut-off voltage is further increased (e.g., the charge cut-off voltage is increased to 4.4 V), the above-described effects are not sufficiently produced.

BRIEF SUMMARY OF THE INVENTION

An object of the present invention is to provide a non-aqueous electrolyte secondary battery whose storage characteristics at high temperature can be increased in the case where the charge cut-off voltage is increased to achieve high battery capacity.

To achieve the object, an aspect of the present invention provides a non-aqueous electrolyte secondary battery including an electrode body including a positive electrode in which a positive electrode active material layer containing a positive electrode active material is formed on a surface of a positive electrode current collector, a negative electrode, and a separator placed between the positive electrode and the negative electrode; a non-aqueous electrolyte; and a casing that accommodates the electrode body and the non-aqueous electrolyte, wherein at least part of a surface of the positive electrode active material is coated with a surface treatment layer composed of a phosphate compound, and the phosphate compound contains at least one element selected from the group consisting of neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

In the above-described structure, since at least part of the surface of the positive electrode active material is coated with the surface treatment layer, the reaction area between the positive electrode active material and an electrolyte is decreased. In addition, it is believed that, since the surface treatment layer is composed of a phosphate compound containing a limited element such as neodymium and the phosphate compound is different from a phosphate compound containing aluminum or lanthanum, the surface treatment layer specifically exhibits an anticatalyst effect. Thus, the reaction between the positive electrode active material and an electrolyte can be suppressed. Accordingly, since the reaction area between the positive electrode active material and the electrolyte can be decreased while at the same time the reaction therebetween can be suppressed, the storage characteristics at high temperature can be improved markedly in the case where the charge cut-off voltage is increased.

Furthermore, since the surface treatment layer specifically exhibits an anticatalyst effect and thus the reaction between the positive electrode active material and the electrolyte is suppressed, the above-described effect is produced without impairing the load characteristics. Normally, when the area of the surface treatment layer that coats the surface of the positive electrode active material is increased, an effect of suppressing the reaction between the positive electrode active material and the electrolyte is sufficiently produced. However, the load characteristics are degraded because the reaction area between the positive electrode active material and the electrolyte is decreased. On the other hand, when the area of the surface treatment layer that coats the surface of the positive electrode active material is decreased, the reaction area between the positive electrode active material and the electrolyte is not so decreased. Therefore, the degradation of the load characteristics is suppressed, but an effect of suppressing the reaction between the positive electrode active material and the electrolyte is not sufficiently produced. That is, the storage characteristics at high temperature and the load characteristics are in a tradeoff relationship. However, in the above-described structure, the effect of suppressing the reaction between the positive electrode active material and the electrolyte is produced by coating only a part of the surface of the positive electrode active material. Therefore, the storage characteristics at high temperature can be improved without impairing the load characteristics.

The element contained in the phosphate compound is preferably at least one element selected from the group consisting of neodymium, samarium, europium, erbium, ytterbium, and lutetium.

The ratio of the phosphate compound on an elemental neodymium, samarium, europium, erbium, ytterbium, or lutetium basis relative to the positive electrode active material is preferably 0.010 mass % or more and 0.25 mass % or less.

If the ratio is less than 0.010 mass %, the effect is not sufficiently produced because the amount of phosphate compound is excessively small. On the other hand, if the ratio is more than 0.25 mass %, the surface of the positive electrode active material is excessively coated with the surface treatment layer. As a result, good storage characteristics at high temperature are achieved, but sufficient initial capacity is not obtained and load characteristics are degraded.

Any material can be used as the positive electrode active material used in the present invention as long as the material can occlude and release lithium and has a noble potential. For example, a lithium transition metal complex oxide having a layered structure, a spinel structure, or an olivine structure can be used. In addition to lithium cobaltate, specific examples of the lithium transition metal complex oxide include lithium complex oxides containing nickel such as a lithium complex oxide of nickel-cobalt-manganese, a lithium complex oxide of nickel-aluminum-manganese, and a lithium complex oxide of nickel-cobalt-aluminum.

Among the positive electrode active materials, a lithium transition metal oxide having a layered structure is preferably used. A lithium transition metal oxide having a layered structure provides high discharge capacity but poor thermal stability. Thus, by coating the positive electrode active material with the surface treatment layer composed of a phosphate compound, thermal stability can be improved while at the same time high discharge capacity can be achieved.

The positive electrode active material may be used alone or may be used by being mixed with other positive electrode active materials.

An aspect of the present invention provides a method for producing a non-aqueous electrolyte secondary battery, including a step of coating at least part of a surface of a positive electrode active material with a surface treatment layer composed of a phosphate compound by adding a phosphate and a salt containing at least one element selected from the group consisting of neodymium, samarium, europium, gadolinium, terbium, dysprosium, holmium, erbium, thulium, ytterbium, and lutetium to a solution containing the positive electrode active material; a step of preparing a positive electrode by forming a positive electrode active material layer on a surface of a positive electrode current collector, the positive electrode active material layer containing a positive electrode active material that is coated with the surface treatment layer composed of the phosphate compound; a step of preparing an electrode body by placing a separator between the positive electrode and a negative electrode; and a step of placing the electrode body and a non-aqueous electrolyte in a casing.

By this production method, the above-described non-aqueous electrolyte secondary battery can be produced.

In the step of coating the surface of the positive electrode active material with the surface treatment layer, an acid or a base is preferably added to the solution containing the positive electrode active material to control pH of the solution to be 2 to 7.

If the pH is less than 2, the phosphate compound is dissolved and thus the surface of the positive electrode active material is sometimes not coated with the surface treatment layer. If the pH is more than 7, not only the phosphate compound but also a hydroxide may be deposited, and the effects unique to a phosphate compound are not sufficiently produced.

The phosphate is preferably at least one selected from the group consisting of disodium hydrogen phosphate dodecahydrate, ammonium dihydrogenphosphate, diammonium hydrogenphosphate, sodium dihydrogen phosphate, phosphoric acid anhydride, phosphoric acid, lithium phosphate, and potassium phosphate.

The salts above are listed as the phosphate, but the phosphate is not limited thereto. Any phosphate can be used as long as the phosphate is soluble in water.

(Other Points)

(1) Any material can be used as the negative electrode active material used in the present invention as long as the material can occlude and release lithium. Examples of the negative electrode active material include carbon materials such as graphite and coke, metal oxides such as tin oxide, metals such as silicon and tin that can occlude lithium by being alloyed with lithium, and metallic lithium. Among these materials, a carbon material such as graphite is preferably used because such a material has little volume change caused when occluding and releasing lithium and good reversibility.

(2) A solvent that has been conventionally used for non-aqueous electrolyte secondary batteries can be employed as a solvent of a non-aqueous electrolyte used in the present invention. Preferable examples of the solvent include carbonic acid ester-based solvents such as ethylene carbonate (EC), propylene carbonate (PC), gamma-butyrolactone (GBL), diethyl carbonate (DEC), methyl ethyl carbonate (MEC), and dimethyl carbonate (DMC); and carbonate-based solvents obtained by replacing part of hydrogen atoms (H) of these carbonates with fluorine atoms (F). Furthermore, a solvent obtained by combining a cyclic carbonic acid ester with a chain carbonic acid ester is particularly preferred.

Examples of a solute of the non-aqueous electrolyte include $LiPF_6$, $LiBF_4$, $LiN(SO_2CF_3)_2$, $LiN(SO_2C_2F_5)_2$, and $LiPF_{6-x}(C_nF_{2n-1})_x$ (where $1<X<6$ and $n=1$ or 2). These materials can be used alone or in combination. The concentration of the solute is not particularly limited, and is preferably in the range of 0.8 to 1.5 moles per 1 liter of the electrolyte.

(3) Examples of the acid used when pH is adjusted include nitric acid, sulfuric acid, and hydrochloric acid. Examples of the base include sodium hydroxide and potassium hydroxide.

According to the present invention, in the case where the charge cut-off voltage is increased to achieve high battery capacity, the storage characteristics at high temperature can be markedly increased.

DETAILED DESCRIPTION OF THE INVENTION

A non-aqueous electrolyte secondary battery according to the present invention will now be described. The non-aqueous electrolyte secondary battery of the present invention is not limited to the embodiments described below, and can be suitably modified within the scope of the present invention.

(Preparation of Positive Electrode)

First, 500 g of lithium cobaltate (represented by $LiCoO_2$, and including 1.5 mol % Al and Mg dissolved therein and 0.05 mol % Zr attached on the surface thereof), which was a positive electrode active material, was added to 3 L of pure water and the mixture was stirred. An aqueous solution obtained by dissolving 0.77 g of disodium hydrogen phosphate dodecahydrate and 0.90 g of neodymium nitrate hexahydrate was added to the mixture being stirred to deposit neodymium phosphate on the surface of lithium cobaltate. Herein, 10 mass % nitric acid and 10 mass % sodium hydroxide solution were suitably added to the resultant solution to keep pH of the solution at 6.5. After such a state was maintained, suction filtration and washing with water were performed. The resultant powder was dried at 120° C. and then fired in the air at 300° C. for 5 hours to obtain lithium cobaltate having a surface treatment layer composed of neodymium phosphate formed on the surface thereof. By observing the positive electrode active material with a scanning electron microscope (SEM), it was confirmed that neodymium phosphate was attached to the surface of lithium cobaltate in a dispersed form. The amount of neodymium phosphate attached to lithium cobaltate was 0.059 mass % on an elemental neodymium basis.

Subsequently, the positive electrode active material, acetylene black (AB) serving as a conducting agent, and polyvinylidene fluoride (PVDF) serving as a binding agent were mixed so as to have a mass ratio of 95:2.5:2.5. The resultant mixture was kneaded together with N-methyl-pyrrolidone (NMP) serving as a solvent to prepare positive electrode active material slurry. The positive electrode active material slurry was applied to both sides of a positive electrode current collector composed of aluminum foil, and drying and rolling were performed to prepare a positive electrode. The packing density of the positive electrode active material was 3.6 g/cc.

(Preparation of Negative Electrode)

Graphite serving as a negative electrode active material, styrene-butadiene rubber (SBR) serving as a binding agent, and carboxymethyl cellulose (CMC) serving as a thickener were mixed so as to have a mass ratio of 98:1:1. The resultant mixture was kneaded in an aqueous solution to prepare a negative electrode active material slurry. The negative electrode active material slurry was applied to both sides of a negative electrode current collector composed of copper foil, and drying and rolling were performed to prepare a negative electrode. The packing density of the negative electrode active material was 1.7 g/cc.

(Preparation of Non-Aqueous Electrolyte)

$LiPF_6$ was added to a solvent obtained by mixing ethylene carbonate (EC) and diethyl carbonate (DEC) at a volume ratio of 3:7 so that the $LiPF_6$ concentration was 1.0 mol/L. Furthermore, vinylene carbonate (VC) was added to the solvent in a concentration of 1 mass % relative to the solvent, and thus a non-aqueous electrolyte was prepared.

(Assembling of Battery)

After lead terminals were attached to the positive electrode and the negative electrode, the positive electrode and the negative electrode were wound with a separator therebetween. This wound body was pressed into a flat shape, whereby an electrode body was prepared. This electrode body was inserted into an aluminum laminate serving as a battery casing and then the non-aqueous electrolyte was injected into the aluminum laminate to produce a test battery. When the battery was charged to 4.4 V, the design capacity thereof was 750 mAh.

EXAMPLES

First Example

Example 1

In Example 1, a battery was produced by the same method as that in the detailed description of the invention.

The thus-produced battery is hereinafter referred to as an invention battery A1.

Example 2

A battery was produced by the same method as that in Example 1, except that a positive electrode active material was used in which samarium phosphate was uniformly dispersed and attached to the surface of lithium cobaltate by using samarium nitrate hexahydrate instead of neodymium nitrate hexahydrate when a phosphate compound was deposited on the surface of lithium cobaltate. The ratio of samarium phosphate on an elemental samarium basis relative to lithium cobaltate was 0.062 mass %. On a molar basis, the amount of samarium phosphate was the same as that of neodymium phosphate in Example 1.

The thus-produced battery is hereinafter referred to as an invention battery A2.

Example 3

A battery was produced by the same method as that in Example 1, except that a positive electrode active material was used in which europium phosphate was uniformly dispersed and attached to the surface of lithium cobaltate by using europium nitrate hexahydrate instead of neodymium nitrate hexahydrate when a phosphate compound was deposited on the surface of lithium cobaltate. The ratio of europium phosphate on an elemental europium basis relative to lithium cobaltate was 0.063 mass %. On a molar basis, the amount of europium phosphate was the same as that of neodymium phosphate in Example 1.

The thus-produced battery is hereinafter referred to as an invention battery A3.

Example 4

A battery was produced by the same method as that in Example 1, except that a positive electrode active material was used in which erbium phosphate was uniformly dispersed and attached to the surface of lithium cobaltate by using erbium nitrate pentahydrate instead of neodymium nitrate hexahydrate when a phosphate compound was deposited on the surface of lithium cobaltate. The ratio of erbium phosphate on an elemental erbium basis relative to lithium cobaltate was 0.070 mass %. On a molar basis, the amount of erbium phosphate was the same as that of neodymium phosphate in Example 1.

The thus-produced battery is hereinafter referred to as an invention battery A4.

Example 5

A battery was produced by the same method as that in Example 1, except that a positive electrode active material was used in which ytterbium phosphate was uniformly dispersed and attached to the surface of lithium cobaltate by using ytterbium nitrate trihydrate instead of neodymium nitrate hexahydrate when a phosphate compound was deposited on the surface of lithium cobaltate. The ratio of ytterbium phosphate on an elemental ytterbium basis relative to lithium cobaltate was 0.071 mass %. On a molar basis, the amount of ytterbium phosphate was the same as that of neodymium phosphate in Example 1.

The thus-produced battery is hereinafter referred to as an invention battery A5.

Example 6

A battery was produced by the same method as that in Example 1, except that a positive electrode active material was used in which lutetium phosphate was uniformly dispersed and attached to the surface of lithium cobaltate by using lutetium nitrate trihydrate instead of neodymium nitrate hexahydrate when a phosphate compound was deposited on the surface of lithium cobaltate. The ratio of lutetium phosphate on an elemental lutetium basis relative to lithium cobaltate was 0.071 mass %. On a molar basis, the amount of lutetium phosphate was the same as that of neodymium phosphate in Example 1.

The thus-produced battery is hereinafter referred to as an invention battery A6.

Comparative Example 1

A battery was produced by the same method as that in Example 1, except that neodymium phosphate was not attached to the surface of lithium cobaltate.

The thus-produced battery is hereinafter referred to as a comparative battery Z1.

Comparative Example 2

A battery was produced by the same method as that in Example 1, except that a positive electrode active material was used in which aluminum phosphate was uniformly dispersed and attached to the surface of lithium cobaltate by using aluminum nitrate nonahydrate instead of neodymium nitrate hexahydrate when a phosphate compound was deposited on the surface of lithium cobaltate. The ratio of aluminum phosphate on an elemental aluminum basis relative to lithium cobaltate was 0.012 mass %. On a molar basis, the amount of aluminum phosphate was the same as that of neodymium phosphate in Example 1.

The thus-produced battery is hereinafter referred to as a comparative battery Z2.

Comparative Example 3

A battery was produced by the same method as that in Example 1, except that a positive electrode active material was used in which lanthanum phosphate was uniformly dispersed and attached to the surface of lithium cobaltate by using lanthanum nitrate hexahydrate instead of neodymium nitrate hexahydrate when a phosphate compound was deposited on the surface of lithium cobaltate. The ratio of lanthanum phosphate on an elemental lanthanum basis relative to lithium cobaltate was 0.057 mass %. On a molar basis, the amount of lanthanum phosphate was the same as that of neodymium phosphate in Example 1.

The thus-produced battery is hereinafter referred to as a comparative battery Z3.

Experiment

Charge and discharge and continuous charge at high temperature were performed on the invention batteries A1 to A6 and the comparative batteries Z1 to Z3 under the conditions below. The residual capacity ratio represented by formula (1) below was calculated and the results are shown in Table 1.

In each of the batteries, a constant-current charge was performed at a current of 1.0 It (750 mA) until the battery voltage reached 4.4 V, and then a charge was performed at a constant voltage of 4.4 V until the current reached 1/20 It (37.5 mA). After each of the batteries was left to stand for 10 minutes, a constant-current discharge was performed at a current of 1.0 It (750 mA) until the battery voltage reached 2.75 V to measure the discharge capacity (discharge capacity before a continuous charge test). After each of the batteries was left in a constant-temperature oven at 60° C. for 1 hour, a constant-current charge was performed at a current of 1.0 It (750 mA) at the same temperature of 60° C. until the battery voltage reached 4.4 V, and then a charge was performed at a constant voltage of 4.4 V for 60 hours. After each of the batteries was taken out of the 60° C. environment and cooled to room temperature, a constant-current discharge was performed at a current of 1.0 It (750 mA) until the battery voltage reached 2.75 V to measure the discharge capacity (first discharge capacity after a continuous charge test). The residual capacity ratio was then calculated using formula (1) below.

Residual capacity ratio (%)=(First discharge capacity after continuous charge test/Discharge capacity before continuous charge test)×100  (1)

The residual capacity ratio indicates the degree of degradation of a battery that is exposed to high temperature in a state of charge. A battery has better thermal stability as the value increases.

TABLE 1

| Type of battery | Type of surface treatment layer | Residual capacity ratio |
| --- | --- | --- |
| Invention battery A1 | neodymium phosphate | 88.8% |
| Invention battery A2 | samarium phosphate | 88.1% |
| Invention battery A3 | europium phosphate | 88.8% |
| Invention battery A4 | erbium phosphate | 88.9% |

TABLE 1-continued

| Type of battery | Type of surface treatment layer | Residual capacity ratio |
|---|---|---|
| Invention battery A5 | ytterbium phosphate | 87.8% |
| Invention battery A6 | lutetium phosphate | 88.7% |
| Comparative battery Z1 | none | 80.3% |
| Comparative battery Z2 | aluminum phosphate | 81.6% |
| Comparative battery Z3 | lanthanum phosphate | 81.2% |

As is clear from Table 1, in the invention batteries A1 to A6 that each use the positive electrode active material in which the surface of lithium cobaltate was coated with a surface treatment layer composed of a phosphate compound of Nd, Sm, Eu, Er, Yb, or Lu, the residual capacity ratio after the continuous charge was 87.8 to 88.9%, which are significantly higher than that of the comparative battery Z1 (the residual capacity ratio after the continuous charge was 80.3%) that used a positive electrode active material in which the surface of lithium cobaltate was not coated with a surface treatment layer. That is, in the invention batteries A1 to A6, the positive electrode active material was less degraded.

As is clear from publicly known documents, the comparative batteries Z2 and Z3 use the positive electrode active material in which the surface of lithium cobaltate were coated with a surface treatment layer composed of aluminum phosphate or lanthanum phosphate, respectively. The residual capacity ratio of the comparative batteries Z2 and Z3 after the continuous charge was 81.6% and 81.2%, respectively, which are slightly higher than that of the comparative battery Z1 but significantly lower than those of the invention batteries A1 to A6.

The reason for these results is unclear. However, in the case of the invention batteries A1 to A6, part of the surface of lithium cobaltate is coated with a surface treatment layer composed of the phosphate compound selected in the present invention. Therefore, the reaction area between lithium cobaltate and the electrolyte is decreased. In addition, it is believed that such a surface treatment layer composed of the phosphate compound of Nd or the like specifically exhibits an anticatalyst effect, thereby suppressing the reaction between the positive electrode active material and the electrolyte.

In contrast, in the case of the comparative batteries Z2 and Z3, the reaction area between lithium cobaltate and the electrolyte is decreased. However, the surface treatment layer composed of aluminum phosphate or lanthanum phosphate does not exhibit an anticatalyst effect and thus the reaction between the positive electrode active material and the electrolyte is not suppressed.

Accordingly, it is believed that, in the case of the invention batteries A1 to A6, since the reaction area between the positive electrode active material and the electrolyte can be decreased while at the same time the reaction therebetween can be suppressed, the above-described experiment results were obtained.

Herein, neodymium, samarium, europium, erbium, ytterbium, and lutetium used for the phosphate compounds exemplified in the First Example are all rare-earth elements and have atomic numbers of 60 (Nd) to 71 (Lu). Since gadolinium (Gd), terbium (Tb), dysprosium (Dy), holmium (Ho), and thulium (Tm) are also all rare-earth elements and have atomic numbers of 60 (Nd) to 71 (Lu), Applicants believe that phosphate compounds of these also produce the same effects.

Second Example

Example

A battery was produced by the same method as that in Example 4 of the First Example, except that the ratio of erbium phosphate on an elemental erbium basis relative to lithium cobaltate was increased to 0.17 mass % when the surface of lithium cobaltate was coated with a surface treatment layer composed of erbium phosphate.

The thus-produced battery is hereinafter referred to as an invention battery B.

Experiment

Charge and discharge and storage were performed on the invention battery B under the conditions described in the First Example. The residual capacity ratio represented by formula (1) above was calculated and the results are shown in Table 2. Table 2 also shows the results of the invention battery A4 and the comparative battery Z1.

TABLE 2

| Type of battery | Type of surface treatment layer | Coating amount | Residual capacity ratio |
|---|---|---|---|
| Invention battery A4 | erbium phosphate | 0.070 mass % | 88.9% |
| Invention battery B | | 0.17 mass % | 88.8% |
| Comparative battery Z1 | none | — | 80.3% |

In the invention battery B in which the ratio of erbium phosphate on an elemental erbium basis relative to lithium cobaltate was 0.17 mass %, the residual capacity ratio after the continuous charge was 88.8%, which is substantially equal to the residual capacity ratio of the invention battery A4 in which the ratio was 0.070 mass % on an elemental erbium basis. Obviously, this value is significantly higher than that of the comparative battery Z1 that used the positive electrode active material in which a surface treatment layer was not formed on lithium cobaltate. Therefore, it is understood that when the ratio of erbium phosphate on an elemental erbium basis relative to lithium cobaltate is in the range of 0.070 mass % or more and 0.17 mass % or less, the residual capacity ratio is high and the degradation of the positive electrode active material is suppressed.

Furthermore, it was found through the detailed examination performed by the inventors of the present invention that the ratio of erbium phosphate on an elemental erbium basis relative to lithium cobaltate was preferably in the range of 0.010 mass % or more and 0.25 mass % or less. When the ratio is less than 0.010 mass %, the content of erbium phosphate is excessively low and thus the effects achieved by its addition cannot be sufficiently produced. On the other hand, when the ratio is more than 0.25 mass %, the effects achieved by its addition can be sufficiently produced. However, the effects are almost the same as those in the case where the ratio is 0.25 mass %. Moreover, the interface resistance is increased and thus the load characteristics may be degraded.

This tendency is not limited to only erbium phosphate, and Applicants believe that there is the same tendency as long as phosphate compounds of neodymium, samarium, europium, gadolinium, terbium, dysprosium, holmium, thulium, ytterbium, and lutetium are used. The reason for this is as follows. As described in the First Example, the residual capacity ratio is improved by employing a phosphate compound other than erbium phosphate. Therefore, similarly to the case of erbium phosphate, it is believed that when the content of the phosphate compound is excessively low, the effects achieved by the addition cannot be sufficiently produced, and, when the content of the phosphate compound is excessively high, the interface resistance is increased and thus the load characteristics may be degraded.

Moreover, the same applies even if a positive electrode active material other than lithium cobaltate is used.

The present invention can be applied to, for example, driving power supplies of mobile information terminals such as cellular phones, notebook computers, and personal digital assistants (PDAs) and driving power supplies of high-power machines such as electric vehicles and power tools.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A non-aqueous electrolyte secondary battery comprising:
an electrode body including a positive electrode in which a positive electrode active material layer containing a positive electrode active material is formed on a surface of a positive electrode current collector, a negative electrode, and a separator placed between the positive electrode and the negative electrode;
a non-aqueous electrolyte; and
a casing that accommodates the electrode body and the non-aqueous electrolyte,
wherein at least part of a surface of the positive electrode active material is coated with a surface treatment layer composed of a phosphate compound, and
the phosphate compound contains at least one element selected from the group consisting of europium, terbium, dysprosium, holmium, erbium, thulium, and lutetium.

2. The non-aqueous electrolyte secondary battery according to claim 1, wherein the at least one element contained in the phosphate compound is at least one element selected from the group consisting of europium, erbium, and lutetium.

3. The non-aqueous electrolyte secondary battery according to claim 1, wherein the ratio of the phosphate compound on an elemental europium, erbium, terbium, dysprosium, holmium, thulium or lutetium basis relative to the positive electrode active material is 0.010 mass % or more and 0.25 mass % or less.

4. The non-aqueous electrolyte secondary battery according to claim 1, wherein the positive electrode active material is a lithium transition metal oxide having a layered structure.

5. The non-aqueous electrolyte secondary battery according to claim 2, wherein the positive electrode active material is a lithium transition metal oxide having a layered structure.

6. The non-aqueous electrolyte secondary battery according to claim 3, wherein the positive electrode active material is a lithium transition metal oxide having a layered structure.

7. A non-aqueous electrolyte secondary battery comprising:
an electrode body including a positive electrode in which a positive electrode active material layer containing a positive electrode active material is formed on a surface of a positive electrode current collector, a negative electrode, and a separator placed between the positive electrode and the negative electrode;
a non-aqueous electrolyte; and
a casing that accommodates the electrode body and the non-aqueous electrolyte,
wherein at least part of a surface of the positive electrode active material is coated with a surface treatment layer composed of a phosphate compound, and
the phosphate compound is one selected from the group consisting of europium phosphate, erbium phosphate, lutetium phosphate, terbium phosphate, dysprosium phosphate, holmium phosphate and thulium phosphate.

8. A non-aqueous electrolyte secondary battery comprising:
an electrode body including a positive electrode in which a positive electrode active material layer containing a positive electrode active material is formed on a surface of a positive electrode current collector, a negative electrode, and a separator placed between the positive electrode and the negative electrode;
a non-aqueous electrolyte; and
a casing that accommodates the electrode body and the non-aqueous electrolyte,
wherein at least part of a surface of the positive electrode active material is coated with a surface treatment layer composed of a phosphate compound, and
the phosphate compound contains at least one element selected from the group consisting of neodymium, samarium, europium, gadolinium, terbium, dysprosium, holmium, erbium, thulium, ytterbium, and lutetium,
wherein the ratio of the phosphate compound on an elemental neodymium, samarium, europium, gadolinium, terbium, dysprosium, holmium, erbium, thulium, ytterbium or lutetium basis relative to the positive electrode active material is 0.059 mass % or more and 0.25 mass % or less.

9. The non-aqueous electrolyte secondary battery according to claim 8,
wherein the ratio of the phosphate compound on an elemental neodymium, samarium, europium, gadolinium, terbium, dysprosium, holmium, erbium, thulium, ytterbium or lutetium basis relative to the positive electrode active material is 0.070 mass % or more and 0.25 mass % or less.

10. The non-aqueous electrolyte secondary battery according to claim 9,
wherein the phosphate compound is one selected from the group consisting of neodymium phosphate, samarium phosphate, europium phosphate, erbium phosphate, ytterbium phosphate, lutetium phosphate, gadolinium phosphate, terbium phosphate, dysprosium phosphate, holmium phosphate, and thulium phosphate.

11. The non-aqueous electrolyte secondary battery according to claim 8, wherein the phosphate compound contains at least one element selected from the group consisting of europium, terbium, dysprosium, holmium, erbium, thulium, and lutetium.

* * * * *